United States Patent [19]

Baba et al.

[11] Patent Number: 4,674,843
[45] Date of Patent: Jun. 23, 1987

[54] GRADIENT INDEX LENS

[75] Inventors: Takeshi Baba, Tokyo; Jun Hattori, Yokohama, both of Japan

[73] Assignee: Canon Kabushiki Kaisha, Tokyo, Japan

[21] Appl. No.: 830,744

[22] Filed: Feb. 19, 1986

[30] Foreign Application Priority Data

Feb. 22, 1985 [JP] Japan .................... 60-34783

[51] Int. Cl.$^4$ ........................... G02B 3/00; G02B 6/18
[52] U.S. Cl. ........................... 350/413; 350/96.31
[58] Field of Search ........................ 350/413, 96.31

[56] References Cited

U.S. PATENT DOCUMENTS

| | | | |
|---|---|---|---|
| 3,637,295 | 1/1972 | Matsumura et al. | 350/413 |
| 3,827,785 | 8/1974 | Matsushita et al. | 350/413 |
| 4,025,157 | 5/1977 | Martin | 350/413 X |

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

A gradient index lens includes first and second flat end faces. A refractive index $N(\gamma)$ at a position deviated by a distance $\gamma$ from an optical axis of the lens is given as $$N(\gamma) = N_0 + N_1\gamma^2 + N_2\gamma^4 + \ldots$$

for $N_1 < 0$ where $N_0, N_1, N_2, \ldots$ are constants, and the following conditions are satisfied:

$$\frac{0.21}{N_0^3} \exp\left[0.95 N_0^{\frac{3}{2}} \frac{Sk'}{f}\right] -$$

$$0.08 \leq N_2 \cdot f^4 \leq \frac{0.21}{N_0^3} \exp\left[0.95 N_0^{\frac{3}{2}} \frac{Sk'}{f}\right] + 0.08$$

$$0.11 \sqrt[3]{\frac{\lambda}{\left(\frac{0.4}{N_0^2} + 1.1 \frac{Sk'}{f}\right)}} \leq \frac{a}{2f} \leq$$

$$0.14 \sqrt[3]{\frac{\lambda}{\left(\frac{0.4}{N_0^2} + 1.1 \frac{Sk'}{f}\right)}}$$

where f is a focal length of the lens, a is an effective lens diameter, Sk' is a work distance, and $\lambda$ is a wavelength in units of microns.

5 Claims, 14 Drawing Figures

GRADIENT INDEX LENS

BACKGROUND OF THE INVENTION

1. Field of the Invention

The present invention relates to a gradient index lens suitable as a collimator lens for a semiconductor laser or light-emitting diode or as a pickup lens for an optical disk.

2. Related Background Art

A SELFOC (trade name) lens is known as a lens with a refractive index profile in a direction perpendicular to an optical axis thereof, i.e., as a gradient index lens of a so-called radial type, and is widespread as an erect equal-size image focusing element in a copying machine or the like.

It is possible to prepare compact gradient index lenses. Gradient index lenses have been recently used in a variety of applications such as collimator lenses for semiconductor lasers or light-emitting diodes or as pickup lenses for optical disks. Such lenses have a large NA (i.e., Numerical Aperture) in practice and must have optical characteristics near diffraction limits even if an object is not located on its axis but near it. The prescribed characteristics are obtained by providing the radial type gradient index lens with arcuate two end faces, as described in Japanese Patent Laid-open Nos. 122512/1983 and 62815/1984. The main reason for using the gradient index lens, however, lies in the fact that the two end faces of the gradient index lens can be easily polished to obtain flat surfaces as compared with a small spherical lens requiring spherical polishing. Therefore, it is undesirable to perform spherical polishing of the two end faces of the gradient index lens.

SUMMARY OF THE INVENTION

It is an object of the present invention to provide a high-performance gradient index lens with two flat end faces, which eliminates the conventional drawbacks.

In order to achieve the above object of the present invention, there is provided a gradient index lens with two flat end faces wherein a refractive index $N(\gamma)$ at a position deviated by a distance $\gamma$ from an optical axis thereof is given by:

$$N(\gamma) = N_0 + N_1\gamma^2 + N_2\gamma^4 + \ldots$$

for $N_1 < 0$
where $N_0, N_1, N_2, \ldots$ are constants, and the following conditions are satisfied:

$$\frac{0.21}{N_0^3} \exp\left[0.95 N_0^{\frac{3}{2}} \frac{Sk'}{f}\right] -$$

$$0.08 \leq N_2 \cdot f \leq \frac{0.21}{N_0^3} \exp\left[0.95 N_0^{\frac{3}{2}} \frac{Sk'}{f}\right] + 0.08$$

$$0.11 \sqrt[3]{\frac{\lambda}{\left(\frac{0.4}{N_0^2} + 1.1 \frac{Sk'}{f}\right)}} \leq \frac{a}{2f} \leq$$

$$0.14 \sqrt[3]{\frac{\lambda}{\left(\frac{0.4}{N_0^2} + 1.1 \frac{Sk'}{f}\right)}}$$

where $f$ if a focal length of the lens, $a$ is an effective lens diameter, $Sk'$ is a work distance, and $\lambda$ is a wavelength in units of microns.

When the above conditions are satisfied, the gradient index lens of the present invention having two flat end faces properly corrects spherical aberration and coma when the gradient index lens is used as a collimator lens for a semiconductor laser or light-emitting diode, or as a pickup lens for an optical disk.

DETAILED DESCRIPTION OF THE PREFERRED EMBODIMENTS

The present invention will be described in detail with reference to the accompanying drawings.

Figure 1:
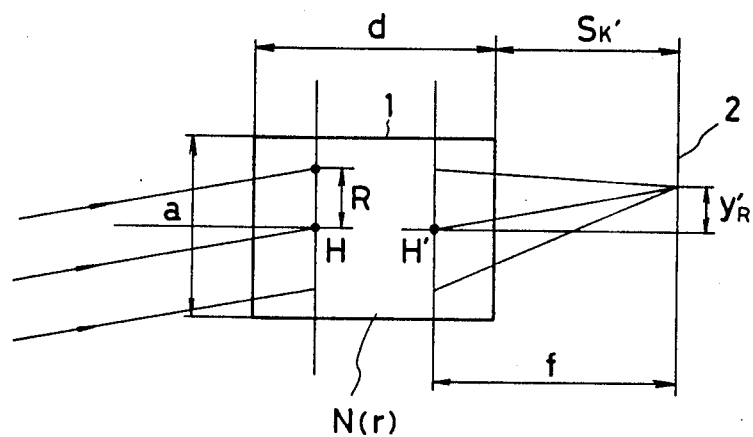
FIG. 1 is a diagram for explaining lens parameters of a lens according to the present invention.

FIG. 1 is a diagram for explaining parameters for the lens according to the present invention. A gradient index lens 1 has a refractive index profile in a plane perpendicular to an optical axis thereof. Light passing through the gradient index lens 1 is focused on an image plane 2. The gradient index profile is given as:

$$N(\gamma) = N_0 + N_1\gamma^2 + N_2\gamma^4 + \ldots \quad (1)$$

for $N_1 < 0$
where $N_0, N_1, N_2, \ldots$ are constants. Referring to FIG. 1, H and H' are two principal points of the lens 1, d is a lens thickness, a is a substantial lens diameter, f is its focal length and $Sk'$ is a work distance. In the following description, an object is assumed to be located at a position an infinite distance from the lens. When the gradient index lens of this embodiment is used as a collimator lens for a semiconductor laser, the semiconductor laser is located at a position on the image plane 2 in FIG. 1.

The focal length f and the work distance $Sk'$ can be represented by using parameters d, $N_0$ and $N_1$ as follows:

$$g = \sqrt{-2N_1/N_0}$$
$$f = 1/N_0 g \sin(gd)$$
$$Sk' = f \cos(gd)$$

Focusing characteristics of a lens are generally determined by spherical aberration as an on-axis aberration and coma proportional to the first order of a field angle. For this reason, third-order spherical aberration and third-order comma must be corrected for a lens such as a collimator lens used such that an object is located near the optical axis. A gradient index coefficient $N_2$ must satisfy condition (2) below:

$$\frac{0.21}{N_0^3} \exp\left[0.95 N_0^{\frac{3}{2}} \frac{Sk'}{f}\right] - 0.08 \leq N_2 \cdot \quad (2)$$

$$f \leq \frac{0.21}{N_0^3} \exp\left[0.95 N_0^{\frac{3}{2}} \frac{Sk'}{f}\right] + 0.08$$

When $N_2$ is less than the lower limit of condition (2), spherical aberration cannot be sufficiently corrected. However, when $N_2$ exceeds the upper limit, spherical aberration is excessively corrected.

The implication of condition (2) will be described in more detail with reference to FIG. 2.

According to J. P. Sands (Jour, Opt. Soc. Am., Vol. 60, PP. 1436–14443, 1970), $N_2$ has a linear relationship with the third-order spherical aberration and the third-order coma. When an $N_2$ value is properly determined for any $N_0$, $N_1$ and d (lens thickness) values or any $N_0$, f and Sk' (work distance) values, the third-order spherical aberration can be completely eliminated.

Figure 2A:
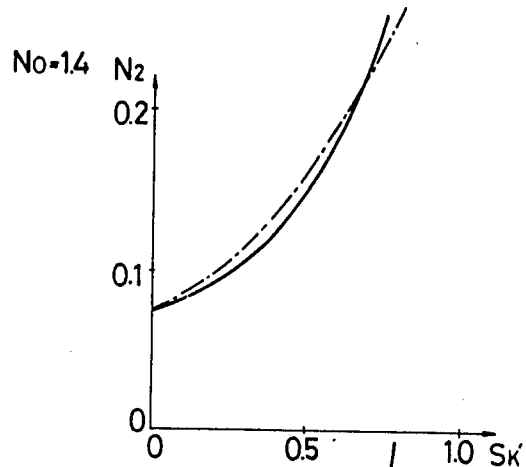
FIGS. 2A to 2C are graphs for explaining a relationship between a work distance $Sk'$ when $N_2$ is given to set a third-order spherical aberration coefficient to zero.
Figure 2B:
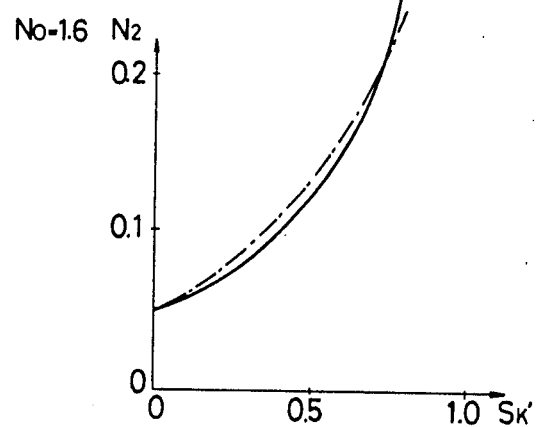
Figure 2C:
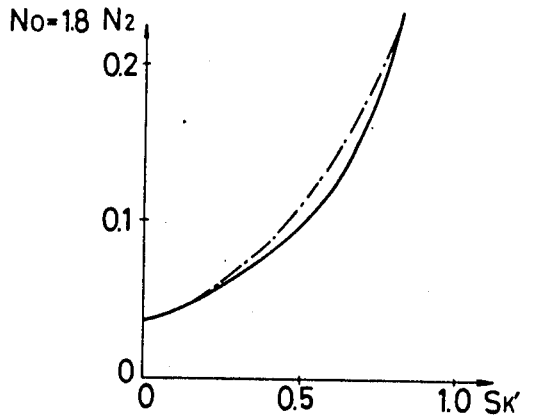

FIGS. 2A to 2C are graphs showing solid characteristic curves representing the relationships between the work distances Sk' and $N_2$ values for obtaining zero third-order spherical aberration coefficient when $N_0$ = 1.4, 1.6 and 1.8, respectively.

The relationship between the $N_2$ and the Sk' and $N_0$ can be approximated as follows:

$$N_2 \sim \frac{0.21}{N_0^3} \exp[0.95 N_0^{3/2} Sk'] \quad (3)$$

The broken lines in FIGS. 2A to 2C show the relationships determined by approximation (3). In fact, when a value of the third-order spherical aberration coefficient I is calculated using the $N_2$ value determined by approximation (3), $|I| < 0.1$ is given. Therefore, approximation (3) can be practically used. On the other hand, a value of the third-order spherical aberration coefficient I upon normalization of the focal length of the lens as 1 is preferably $|I| \lesssim 0.5$ from the practical point of view. Therefore, $N_2$ must fall within a range with, as the central value, the value determined by approximation (3). Therefore, the spherical aberration can be corrected by equation (2) within the practical range.

In order to eliminate coma, the lens diameter a must satisfy condition (4):

$$0.11 \sqrt[3]{\frac{\lambda}{\left(\frac{0.4}{N_0^2} + 1.1 \frac{Sk'}{f}\right)}} \leq \frac{a}{2f} \leq \quad (4)$$

$$0.14 \sqrt[3]{\frac{\lambda}{\left(\frac{0.4}{N_0^2} + 1.1 \frac{Sk'}{f}\right)}}$$

Where $\lambda$ is a wavelength expressed in units of microns. When the lens diameter a exceeds the upper limit of condition (4), practical characteristics of the collimator lens cannot be obtained due to coma. However, when the lens diameter a is less than the lower limit of condition (4), the collimator lens characteristics cannot be practical, either. The meaning of condition (4) will be described below.

According to Yoshiya Matsui, "Lens Design Method", 1972, when the spherical aberration is sufficiently corrected, a wavefront aberration W near the optical axis in the third-order aberration region can be derived as approximation (5) below:

$$W \sim -\frac{1}{2} II \cdot y_R' \cdot \left(\frac{R}{f}\right)^3 \quad (5)$$

where II is the third-order coma coefficient when the focal length of the lens is normalized as 1, $y_R'$ is the image height, and R is the height of incident light from the optical axis on an incident pupil plane. Approximation (5) represents the wavefront aberration of meridional light passing at the height R on the incident pupil plane and reaching the image height $y_R'$. When the spherical aberration is already corrected, the coma does not depend on the incident pupil position. Therefore, it is assumed that the incident pupil is located at the front principal plane of the lens for the sake of simplicity. Also note that the relationship between $y_R'$ and R is illustrated in FIG. 1.

Since the size of the incident pupil is substantially the same as the lens diameter a, a pg,10 residual wavefront aberration W' defined as a difference between the maximum and minimum values of wavefront aberration at the image height $y_R'$ is derived from approximation (5) as:

$$W' = -II \cdot y_R' \cdot \left(\frac{a}{2f}\right)^3 \quad (6)$$

The maximum value of the image height $y_R'$ is mainly determined by mechanical precision of a lens support mechanism. When the gradient index lens of this embodiment is used as a collimator lens for a semiconductor laser, the semiconductor laser is preferably located on the optical axis of the lens. However, in practice, the semiconductor laser is deviated from the optical axis due to a machining error of a lens barrel and a relative mounting error between the lens barrel and the semiconductor laser. It is difficult to normally decrease a deviation of the semiconductor laser from the optical axis to be less than 100 μm. In order to further improve the precision of the position of the semiconductor laser, the semiconductor laser position must be adjusted after the semiconductor lens and the lens are mounted. Such adjustment is impractical. In consideration of the above situation, the lens must have diffraction limit characteristics even if the image height $y_R'$ is as large as 100 μm. In other words, the residual wavefront aberration $W'$ must be less than ¼ the wavelength used in practice. When the used wavelength in units of microns is given as $\lambda$, the following condition must be satisfied:

$$\lambda/4 \geq 100 \cdot |II| \cdot (a/2f)^3 \qquad (7)$$

Figure 3A:
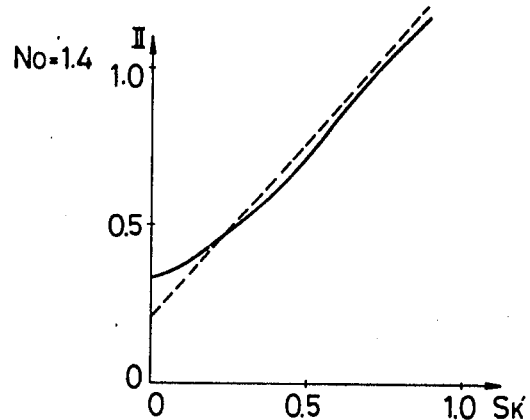
FIGS. 3A to 3C are graphs for explaining a relationship between the work distance $Sk'$ and the third-order coma coefficient when $N_2$ is given to set the third-order spherical aberration to zero.
Figure 3B:
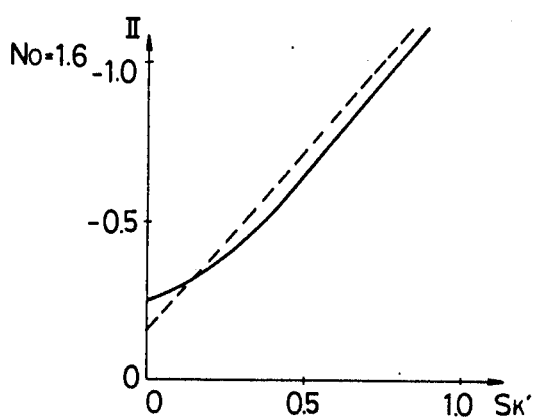
Figure 3C:
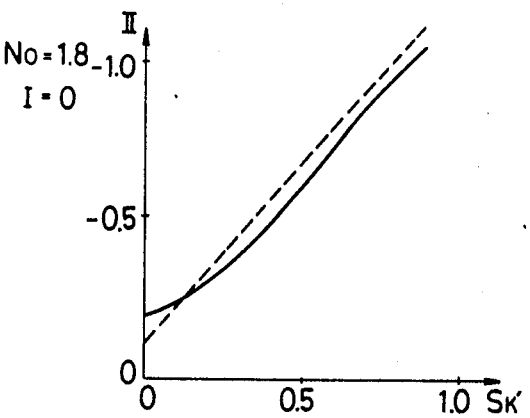

FIGS. 3A to 3C are graphs showing the relationships between work distances Sk' and third-order coma coefficients II when $N_2$ values for obtaining zero third-order spherical aberration coefficient are set when $N_0 = 1.4$, 1.6 and 1.8, respectively. The relationship between the Sk' and the $N_0$ and II can be given by approximation (8) below:

$$II \sim -(0.4/N_0^2 + 1.1 Sk') \qquad (8)$$

The broken lines indicate characteristic curves determined by approximation (8). As is apparent from condition (7) and approximation (8), when the lens diameter a exceeds the upper limit of condition (4), the residual wavefront aberration $W'$ exceeds ¼ of the used wavelength. As a result, the characteristics for the diffraction limits cannot be obtained. Even if the residual wavefront aberration is decreased to ⅛ or less of the used wavelength, the focusing characteristics cannot be greatly improved. The NA represented by a/2f is excessively decreased, resulting in impractical applications. Therefore, the lens diameter a must not be less than the lower limit of condition (4). It should be noted that the focal length f does not appear in approximations (3) and (8) since the f is normalized to 1.

Figure 4A:
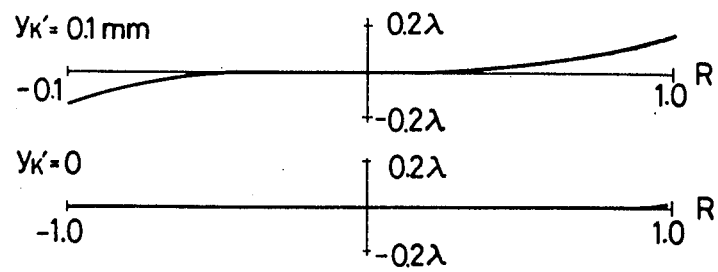
FIGS. 4A to 4C are graphs showing wavefront aberration according to an embodiment of the present invention.
Figure 4B:
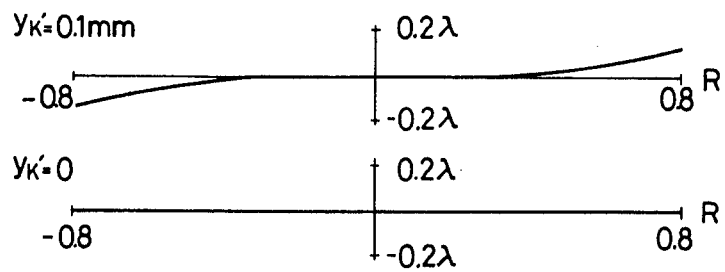
Figure 4C:
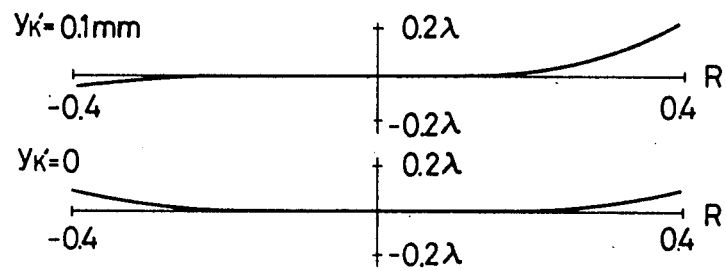
Figure 5A:
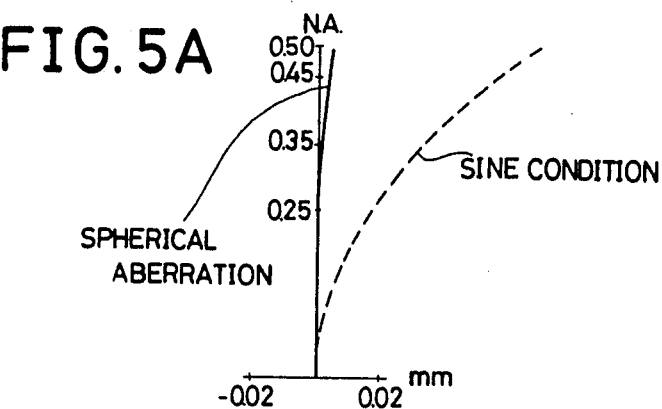
FIGS. 5A and 5B are graphs respectively showing the spherical aberration and the sine condition, and the transverse aberration (half field angle is 1.7°) according to another embodiment of the present invention.
Figure 5B:
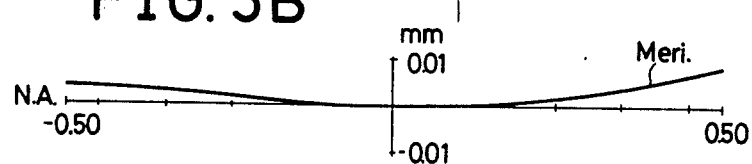
Figure 6A:
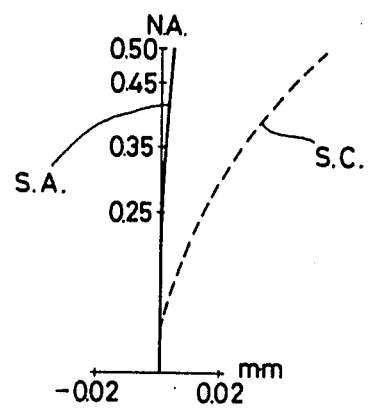
FIGS. 6A and 6B are graphs respectively showing the spherical aberration and the sine condition, and the transverse aberration (half field angle is 1.7°) according to still another embodiment of the present invention.
Figure 6B:
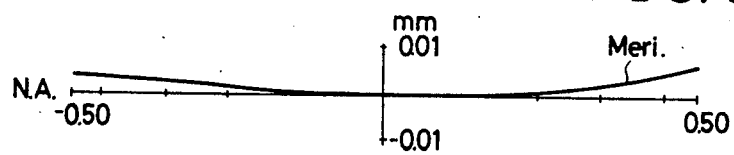

Tables 1 and 2 summarize gradient index lenses according to examples of the present invention. More specifically, Table 1 shows examples (a), (b) and (c). The lens thickness d, the values of gradient index coefficients $N_0$, $N_1$ and $N_2$, the lens diameter a, the lens focal length f, the lens work distance Sk', the third-order spherical aberration coefficient I upon normalization of the focal length as 1, and the value of the third coma coefficient II upon normalization of the focal length as 1 of each example are listed. It should be noted that these values are obtained at a wavelength of 0.8 μm. FIGS. 4A to 4C show wavefront aberrations of examples (a), (b) and (c) in Table 1. In this case, the wavefront aberration is calculated when the incident pupil is located on the incident end face of the lens.

Table 2 summarizes the values of d, $N_0$, $N_1$, f, I and II of examples (d) and (e).

TABLE 1

| Parameter | Example (a) | Example (b) | Example (c) |
|---|---|---|---|
| d (mm) | 12.567 | 8.455 | 4.006 |
| $N_0$ | 1.60 | 1.40 | 1.80 |
| $N_1$ (1/mm$^2$) | $-1.250 \times 10^{-2}$ | $-1.570 \times 10^{-2}$ | $-4.822 \times 10^{-2}$ |
| $N_2$ (1/mm$^4$) | $8.14 \times 10^{-5}$ | $1.78 \times 10^{-4}$ | $2.50 \times 10^{-3}$ |
| a (mm) | 2.0 | 1.6 | 0.8 |
| f (mm) | 5.0 | 5.0 | 3.0 |
| Sk' (mm) | 0.0 | 1.5 | 1.8 |
| I | 0.00 | 0.00 | $-0.52$ |
| II | $-0.26$ | $-0.51$ | $-0.87$ |

TABLE 2

| Parameter | Example (d) | Example (e) |
|---|---|---|
| d (mm) | 5.02 | 5.65 |
| $N_0$ | 1.6 | 1.8 |
| $N_1$ (1/mm$^2$) | $-7.813 \times 10^{-2}$ | $-6.945 \times 10^{-2}$ |
| $N_2$ (1/mm$^4$) | $3.179 \times 10^{-3}$ | $2.233 \times 10^{-3}$ |
| a (mm) | 1.8 | 1.8 |
| f (mm) | 2.0 | 2.0 |
| Sk' (mm) | 0 | 0 |
| I | 0 | 0 |
| II | $-0.26$ | $-0.20$ |

As is apparent from condition (4), the larger the on-axis refractive index $N_0$ is, the larger the NA is. Preferably $N_0 = 16.0$. When a ratio Sk'/f is small, the NA can be increased. The ratio Sk'/f $\leq 0.6$ is preferred. When the value of the third-order spherical aberration coefficient I is increased from zero, the absolute value of the third-order coma coefficient II tends to slightly decrease. As a result, the NA can be large. Preferably, $$\frac{0.21}{N_0^3} \exp\left[ 0.95 N_0^{\frac{3}{2}} \frac{Sk'}{f} \right] - 0.08 \leq N_2.$$

$$f \leq \frac{0.21}{N_0^3} \exp\left[ 0.95 N_0^{\frac{3}{2}} \frac{Sk'}{f} \right]$$

When a gradient index lens of the present invention is used as a collimator lens for a light source such as a light-emitting diode with a wide wavelength distribution, a peak wavelength in the wavelength range is used as the wavelength $\lambda$ in condition (4). It is possible to set the lens diameter a exceeding the upper limit of condition (4) and light is limited by an aperture, thereby substantially satisfying condition (4). However, a refractive index profile of a radial type gradient index lens is provided by a means such as an ion exchange technique from the periphery of the lens. Therefore, when a lens diameter is very large, the fabrication time and cost are greatly increased.

The high-quality gradient index lens according to the present invention can properly correct both spherical aberration and coma although the lens has two flat end faces.

What we claim is:
1. A gradient index lens comprising:
a first flat end face; and
a second flat end face,
wherein a refractive index $N(\gamma)$ at a position deviated by a distance $\gamma$ from an optical axis of said lens is given as

$$N(\gamma) = N_0 + N_1\gamma^2 + N_2\gamma^4 + \ldots$$

for $N_1 < 0$ where $N_0$, $N_1$, $N_2$, ... are constants, and the following conditions are satisfied:

$$\frac{0.21}{N_0^3} \exp\left[ 0.95 N_0^{\frac{3}{2}} \frac{Sk'}{f} \right] -$$

-continued $$0.08 \leq N_2 \cdot f \leq \frac{0.21}{N_0^3} \exp\left[0.95 N_0^{\frac{3}{2}} \frac{Sk'}{f}\right] + 0.08$$

$$0.11 \sqrt[3]{\frac{\lambda}{\left(\frac{0.4}{N_0^2} + 1.1 \frac{Sk'}{f}\right)}} \leq \frac{a}{2f} \leq$$

$$0.14 \sqrt[3]{\frac{\lambda}{\left(\frac{0.4}{N_0^2} + 1.1 \frac{Sk'}{f}\right)}}$$

where f is a focal length of said lens, a is a substantial lens diameter, Sk' is a work distance, and $\lambda$ is a wavelength in units of microns.

2. A lens according to claim 1, wherein $N_0 \geq 1.60$.
3. A lens according to claim 1, wherein $Sk'/f \leq 0.6$.
4. A lens according to claim 1, wherein a condition below is satisfied:

$$\frac{0.21}{N_0^3} \exp\left[0.95 N_0^{\frac{3}{2}} \frac{Sk'}{f}\right] - 0.08 \leq N_2 \cdot$$

$$f \leq \frac{0.21}{N_0^3} \exp\left[0.95 N_0^{\frac{3}{2}} \frac{Sk'}{f}\right]$$

5. A lens according to claim 1, wherein the wavelength $\lambda$ is a peak wavelength when a wavelength distribution is wide.

* * * * *

UNITED STATES PATENT AND TRADEMARK OFFICE
CERTIFICATE OF CORRECTION

PATENT NO. : 4,674,843
DATED : June 23, 1987
INVENTOR(S) : TAKESHI BABA, ET. AL.

It is certified that error appears in the above-identified patent and that said Letters Patent is hereby corrected as shown below:

Column 4, line 45, "pg,10" should be deleted.

Signed and Sealed this

Thirteenth Day of October, 1987

Attest:

DONALD J. QUIGG

Attesting Officer

Commissioner of Patents and Trademarks